United States Patent Office 3,521,722
Patented July 28, 1970

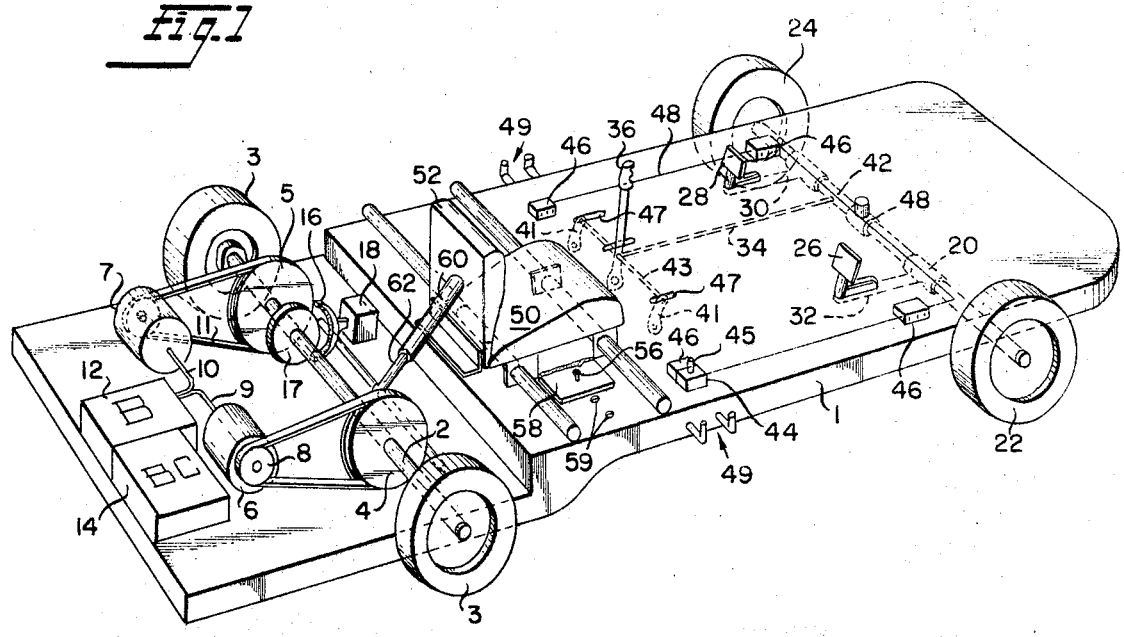

3,521,722
INVALID GO-CART
Raul R. V. Dimonte, 21 Arbor Hill Road,
Annapolis, Md. 21403
Filed July 17, 1967, Ser. No. 653,949
Int. Cl. B60l *11/18, 15/42*
U.S. Cl. 180—65
6 Claims

ABSTRACT OF THE DISCLOSURE

An invalid mobility go-cart for allowing a handicapped person to move about without assistance from another person. Motive means of the go-cart is provided by two electric motors, one to move the cart forward and the other to move the cart in reverse.

BACKGROUND AND OBJECTS

It is well-known and understood that a physically handicapped person can perform many tasks with those faculties which are functioning properly. For example, a stroke patient, though partially paralyzed, may be able to use one or both hands and arms while being unable to walk. If, therefore, a simple means were available for the patient to move about, for example, in a cart, he may be able to do simple gardening chores which would, in addition to giving the patient pleasure, be healthful with respect to being out-of-doors in the fresh air and sunshine.

Various types of vehicles have been before developed to assist invalids in moving about, but some of these vehicles are difficult for a partially paralyzed person to operate, or are built too high from the ground to allow the patient to perform tasks at ground level.

It is therefore an object of the present invention to provide a vehicle for handicapped persons which is easy to operate even if the person has limited use of his body.

It is a further object of this invention to provide a vehicle which is constructed low to the ground so that the operator can, from his seat in the vehicle perform tasks at ground level, such as gardening.

It is a further object of the invention to provide a vehicle with two separate driving means, one for operating forwardly and the other for operating in reverse.

A still further object is to provide a vehicle wherein steering and operating can be performed by either the hands or the feet.

And a still further object is to provide a vehicle with a seat which is adjustable from side to side to allow the operator to work on either side of the vehicle.

SUMMARY OF THE INVENTION

One form of this invention is a four-wheel electrically driven vehicle with alternate hand or foot steering and operating, together with a seat adjustable from side to side, and wherein the brake is automatically operated whenever the driving motors are in the off position.

BRIEF DESCRIPTION OF THE DRAWINGS

The foregoing and other objects, features and advantages of the invention will become more apparent from the following detailed description and accompanying drawings, wherein:

FIG. 1 is an overall view of the cart in perspective.

FIG. 2 shows the construction of the adjustable seat back.

FIG. 3 shows the adjustment of the seat from side to side.

DETAILED DESCRIPTION OF THE INVENTION

Figure 4:
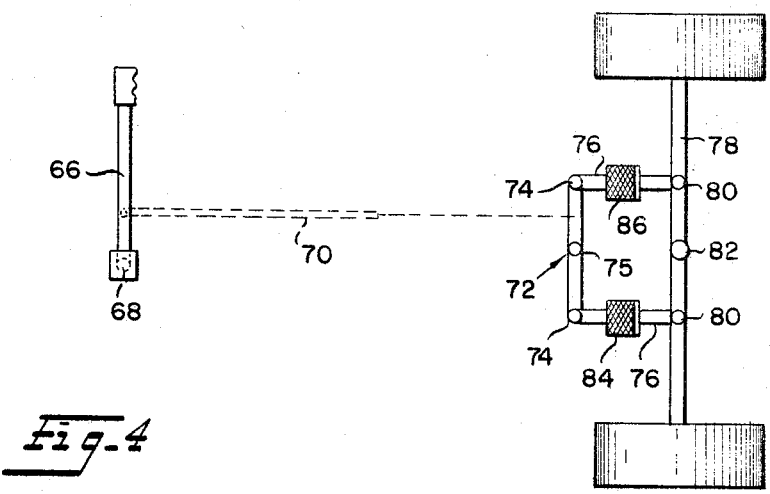
FIG. 4 is a view, partially in perspective, of the alternate steering mechanism.

Referring now to the drawings in detail, in particular to FIG. 1, a vehicle is shown in perspective comprising a body portion 1, having mounted thereon a rear axle 2 to support the rear of the cart. On the axle are mounted rear wheels 3 and two large driving pulley wheels 4 and 5, pulley 4 and an associated motor 6 being operative to drive the vehicle in a forward direction and pulley 5 and an associated driving motor 7 being operative to drive the vehicle in a reverse direction. A pulley 8 is provided on each of the motors, these pulleys being smaller than pulleys 4 and 5 in order to effect a speed reduction from the motor to the axle drive. Belts or chains 11 are provided to connect the motor pulleys and drive pulleys. The two motors 6 and 7 are connected by means of wires 9 and 10, respectively, to a battery 12 which is in turn connected to a suitable battery charger 14. The actual connections from the motors to the battery and battery charger are shown in the more detailed description of FIG. 5 and will be discussed below. A single reversible motor could also be used.

Also associated with axle 2 is a brake shoe 16 which is operated by a solenoid 18, to act against brake drum 17 which, again, will be discussed with reference to FIG. 5.

On the front portion of the vehicle body is mounted an axle 20 upon which in turn are mounted wheels 22 and 24. One embodiment of the steering mechanism is shown in FIG. 1 and comprises two pedals 26 and 28 connected by rods 30 and 32 to the front axle 20. This allows the vehicle to be steered by pressure on the right pedal 26 to turn to the left and pressure on the left pedal 28 to execute a turn to the right. In addition, an alternate steering mechanism is provided through shaft 34 to a steering stick 36 which is pivoted at point 38, the shaft 34 being connected at a point 40 above the pivot point 38 so that upon moving the stick forward, the movement of an offset connection 42 and axle 20 will cause the vehicle to turn to the right. Back pressure on the control stick 36 will then cause the vehicle to turn to the left.

A crossbar 43 is provided to cooperate with control stick 36, and extends on both sides of shaft 34 to a pair of pivoting assemblies 41. The control stick 36 can be detached from its central position and placed on either side through a plurality of slots 47 to operate the steering linkage from either side of this vehicle to correspond with the position of the seat desired by the operation.

Mountable in several positions around the frame of the vehicle is an operating switch 44. This is a three-position switch operated through a protruding lever 45 by hand. There are a plurality of switch locations 46 into which the switch may be plugged. The switch is arranged such that it is easily detachable and can be moved to any of the four locations 46 indicated by merely unplugging from one position and plugging into another position. The forward switch locations 46 are operable by the foot of the user. The switches are all attached through cable 48 which runs around the periphery of the vehicle, and back to the motor control shown in FIG. 5.

Also provided at several positions on the vehicle body are several mounting brackets 49 on which may carry a box for holding gardening tools and the like, within easy reach of the occupant.

Further provided in this vehicle is a seat having a seat portion 50 and a backrest portion 52. The seat is adjustable from side to side through a series of holes 54, and a peg 56 is provided on a plate 58 attached to the seat, to lock the seat into position. The seat is further adjustable by providing a cylinder 60 connected to the backrest of the seat 52, the cylinder being operable with a second, telescoping cylinder 62 and connected to a bar 64 whereon it can slide from side to side in relation to the movement from side to side of the seat, and the tilt of the backrest may also be adjusted by sliding the cylinder 62 into and out of the cylinder 60.

Seen in FIG. 2 is a seat 51 comprising a seat portion 50, and a seat backrest 52. The cylinder 60 is shown in side view as is the telescoping cylinder 62. The bar 64 is shown as a pivot point allowing the seat back to be adjusted for the degree of tilt by a locking pin 66 which is operative to correspond to holes both in the outer cylinder and the inner, telescoping, cylinder.

FIG. 3 discloses the side to side operation of the seat and is shown with the seat portion indicated generally at 50 and the seat back shown from the top indicated at 52. For clarity, the piston arrangement for the seat back adjustment is not shown in this view. The holes 54 are shown to run the width of the vehicle's frame and the locking pin 56 is shown in top view as being engaged with plate 58 and one of the holes 54 to correspond to the desired position of the seat.

FIG. 4 shows a second embodiment of a steering mechanism which comprises a stick type lever 66 pivoted at a point 68. Attached above the pivot point 68 and at a distance sufficient to cause movement is a shaft 70 which transmits motion to an axle 78 through linkage 72 and 76. The steering shaft 70 is associated with the shaft 72 which is perpendicular to shaft 70. The connection between shafts 70 and 72 is offset to either the right or left to provide a moment for operation. The shaft 72 is connected through suitable couplings 74 to further shafts 76 which are then connected to the axle 78 at pivot points 80. For rigidity, a further pivot is provided at 75, to attach to the vehicle body. The center pivot of the axle 78 is shown at 82. Further provided in this steering mechanism are a pair of pedals 84 and 86 which will allow the vehicle to be steered by the feet if the operator does not have use of his arms.

Figure 5:
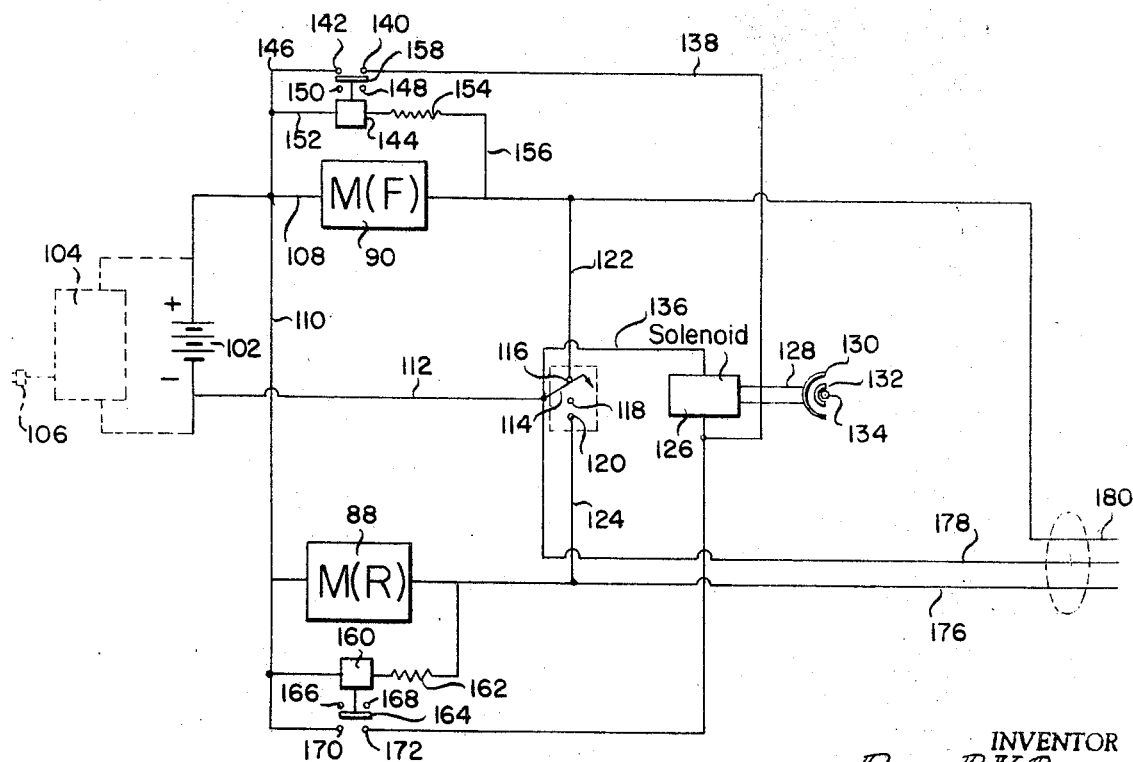
FIG. 5 is a schematic diagram of the circuitry of the electric motor and brake means.

Seen in FIG. 5 is a schematic wiring diagram of the motor and braking system. The motor for driving the vehicle in a forward direction is shown at 90, and the motor for driving the vehicle in a reverse direction is shown at 88. A battery is provided at 102 and has associated with it a battery charger 104 which may be of any known type. A plug is shown at 106 which is available to connect the charger to a standard 110 volt, 60 cycle power line.

The positive terminal of battery 102 is connected through lines 108 and 110 to the proper terminals of motors 90 and 88, respectively. Motors 88 and 90 are shown here only as blocks, but the various connections of motors are well known, and any suitable circuit may be used. The negative terminal of battery 102 is connected through line 112 to a switch 114. The switch 114 has three terminals, 116, 118 and 120. Switch terminal 116 is connected through line 122 to a second terminal of motor 90 and switch terminal 120 is connected through line 124 to a second terminal of motor 88. Thus, when switch 114 is in contact with switch terminal 116, the circuit between battery 102 and motor 90 is complete, and the motor 90 is energized. Similarly, when switch 114 is in contact with switch terminal 120, the circuit between battery 102 and motor 88 is complete, and motor 88 is energized. When switch 114 is in contact with switch terminal 118, however, neither motor is energized.

The braking system of the vehicle is provided through a solenoid 126. Solenoid 126 is normally in such a position as to cause a brake shoe 130, which is operated through a shaft 128, to engage with a brake drum 132 which is attached to the axle of the vehicle, shown here as 134. When either motor 88 or 90 is energized, solenoid 126 is pulled in, thus releasing the brake shoe 130 from drum 132.

The circuitry for energizing and de-energizing the solenoid 126 is as follows: One terminal of solenoid 126 is connected, through a line 136 to switch 114 which, in turn, is connected through line 112 to the negative terminal of battery 102. A second terminal of solenoid 126 is connected through line 138 to a first switch terminal 140 of a second solenoid 144. A second switch terminal 142 of solenoid 144 is connected through line 146 to the positive terminal of battery 102.

Solenoid 144 normally engages contacts 148 and 150 through switch arm 158. When the solenoid 144 is energized, however, switch arm 148 engages terminals 140 and 142 and completes a circuit through these two terminals. Current is supplied to the solenoid 144 through line 152 which is connected to the positive terminal of battery 102. The solenoid circuit is completed through current limiting resistor 154, through line 156 to contact 116 of switch 114.

Thus, in operation, when switch 114 is in contact with the center terminal 118, motor 90 is de-energized as earlier discussed. Solenoid 126 remains connected to the negative terminal of battery 102 through line 112. The circuit of solenoid 126 is broken, however, at terminals 140 and 142. The solenoid 126 is thus also de-energized, and braking action commences between shoe 130 and drum 132.

When switch 114 is thrown to contact terminal 116, motor 90 is energized and solenoid 144 is similarly energized, it being in a parallel loop to motor 90. When solenoid 144 is energized, the shorting bar 158 comes into contact with terminal 140 and 142 and the circuit of solenoid 126 is thus completed, and brake shoe 130 is pulled away from drum 132.

The brake solenoid is similarly energized when switch 114 is in contact with terminal 120. In this case, motor 88 and thereby its parallel loop containing solenoid 160 and limiting resistor 162 is energized. The energization of solenoid 160 causes shorting bar 164 which is normally in contact with terminals 166, 168 to come into contact with terminals 170 and 172. The shorting action between terminals 170, 172 operates to complete the circuit of solenoid 126 in the same manner as previously discussed. This, again will cause the release of brake shoe 130 from drum 132 whenever motor 88 is energized.

Terminals 116 and 120 of switch 114 are carried through lines 122, 174 and 124, 176, respectively, along with a connection from switch 114 itself through line 178 to a cable 180. Cable 180 is run around the periphery of the vehicle body to switch terminals as discussed with reference to FIG. 1, to provide for switch outlets at a number of convenient places.

It should be noted that although a conventional battery charger is shown at 104, an internal system may also be used. When one motor is energized to drive the vehicle, the other motor continues to turn backward through its coupling to the drive axle, thus acting as a generator. The unused output of this generator can be used to charge a battery if proper circuitry were provided.

While the invention has been described, it will be understood that it is capable of further modification and this application is intended to cover any variations, uses, or adaptations of the invention following in general the principles of the invention, and including such departure from the present disclosure as come within the knowledge or customary practice in the art to which the invention pertains, and as may be applied to the essential features hereinbefore set forth and as fall within the scope of the invention or the limits of the appended claims.

What is claimed is:
1. A vehicle comprising:
 (a) a body portion having operably mounted thereon first and second axles,
 (b) said first axle having first and second operating means,
 (c) said first operating means being operatively coupled to a first driving prime mover,

(d) said second operating means being operatively coupled to a second driving prime mover,
(e) said first prime mover being energizable to drive said vehicle in a first direction,
(f) said second prime mover being energizable to drive said vehicle in a second, opposite, direction,
(g) said first and second prime movers being interconnected such that only one of said prime movers is energized at a given time,
(h) brake means operable when neither of said first and second prime movers is energized,
(i) said brake means is operated by a solenoid,
(j) the said solenoid actuating a shaft connected to a brake shoe,
(k) said brake shoe cooperating with a brake drum mounted on the first said axle,
(l) whereby said brake shoe frictionally engages said brake drum when neither of said first and second prime movers is energized, and said brake shoe is pulled away from said brake drum when either of said first and second prime movers is energized.

2. A vehicle comprising:
(a) a body portion having operably mounted thereon first and second axles,
(b) said first axle having first and second operating means,
(c) said first operating means being operatively coupled to a first driving prime mover,
(d) said second operating means being operatively coupled to a second driving prime mover,
(e) said first prime mover being energizable to drive said vehicle in a first direction,
(f) said second prime mover being energizable to drive said vehicle in a second, opposite, direction,
(g) said first and second prime movers being interconnected such that only one of said prime movers is energized at a given time,
(h) means for selectively energizing one of said first and second prime movers, and
(i) said second axle having connected thereon an alternate steering mechanism, comprising:
  (1) pivot means in the center of said second axle to allow said second axle to be turned from side to side,
  (2) pedal means connected to said second axle, one pedal on each side of said pivot means to allow steering with the feet,
  (3) first shaft means pivotally connected to said second axle at a point to one side of said pivot means,
  (4) vertically pivotally mounted control shaft operatively connected to said first shaft means,
  (5) whereby movement of said control shaft causes steering movement of said second axle.

3. A vehicle as set forth in claim 2 further comprising:
(a) brake means operable when either of said first and second prime movers is energized,
(b) said brake means being operated by a solenoid,
(c) said solenoid actuating a shaft connected to a brake shoe,
(d) said brake shoe cooperating with a brake drum mounted on the first said axle,
(e) whereby said brake shoe frictionally engages said brake drum when neither of said first and second prime movers is energized, and said brake shoe is pulled away from said brake drum when either of said first and second prime movers is energized.

4. A vehicle comprising:
(a) a body portion having operably mounted thereon first and second axles,
(b) said first axle having first and second operating means,
(c) said first operating means being operatively coupled to a first driving prime mover,
(d) said second operating means being operatively coupled to a second driving prime mover,
(e) said first prime mover being energizable to drive said vehicle in a first direction,
(f) said second prime mover being energizable to drive said vehicle in a second, opposite, direction,
(g) said first and second prime movers being interconnected such that only one of said prime movers is energized at a given time,
(h) means for selectively steering said vehicle by means held by hand or operated by feet, and
(i) means for operating said prime mover from a plurality of positions on said body portion.

5. A vehicle comprising:
(a) a body portion having operably mounted thereon first and second axles,
(b) said first axle having first and second operating means,
(c) said first operating means being operatively coupled to a first driving prime mover,
(d) said second operating means being operatively coupled to a second driving prime mover,
(e) said first prime mover being energizable to drive said vehicle in a first direction,
(f) said second prime mover being energizable to drive said vehicle in a second, opposite, direction,
(g) said first and second prime movers being interconnected such that only one of said prime movers is energized at a given time,
(h) a seat,
(i) said seat being movable along the width of the said body portion, and
(j) means to lock said seat in a plurality of desired locations, and said vehicle being operable from any one of said desired locations.

6. A vehicle as set forth in claim 5, further comprising:
(a) a backrest portion associated with said seat,
(b) means for adjusting the angle of inclination of said backrest portion of said seat,
(c) said means for adjusting comprising hollow telescoping cylinders with means to secure the said backrest in any of a number of positions.

References Cited

UNITED STATES PATENTS

| | | | |
|---|---|---|---|
| 653,855 | 7/1900 | Torbensen | 180—62 |
| 834,007 | 10/1906 | Fischer | 180—1 |
| 1,504,263 | 8/1924 | Mulder | 280—97 |
| 1,540,170 | 6/1925 | Frick | 180—65 |
| 1,562,903 | 11/1924 | Miller | 180—65 |
| 2,386,186 | 10/1945 | Alben | 180—67 XR |
| 2,586,273 | 2/1952 | Steven | 180—65 XR |
| 2,753,947 | 7/1956 | Mach | 296—65 XR |
| 2,859,797 | 11/1958 | Mitchelson | 296—65 XR |
| 3,036,652 | 5/1962 | Barenyi | 180—54 |
| 3,351,148 | 11/1967 | Solomon | 180—65 XR |

FOREIGN PATENTS

| | | |
|---|---|---|
| 355,151 | 6/1922 | Germany. |
| 749,703 | 12/1944 | Germany. |

BENJAMIN HERSH, Primary Examiner

M. L. SMITH, Assistant Examiner

U.S. Cl. X.R.

180—54; 280—87.1; 296—65